D. J. HAVENSTRITE.
APPARATUS FOR MAKING ICE.
APPLICATION FILED JULY 1, 1908.

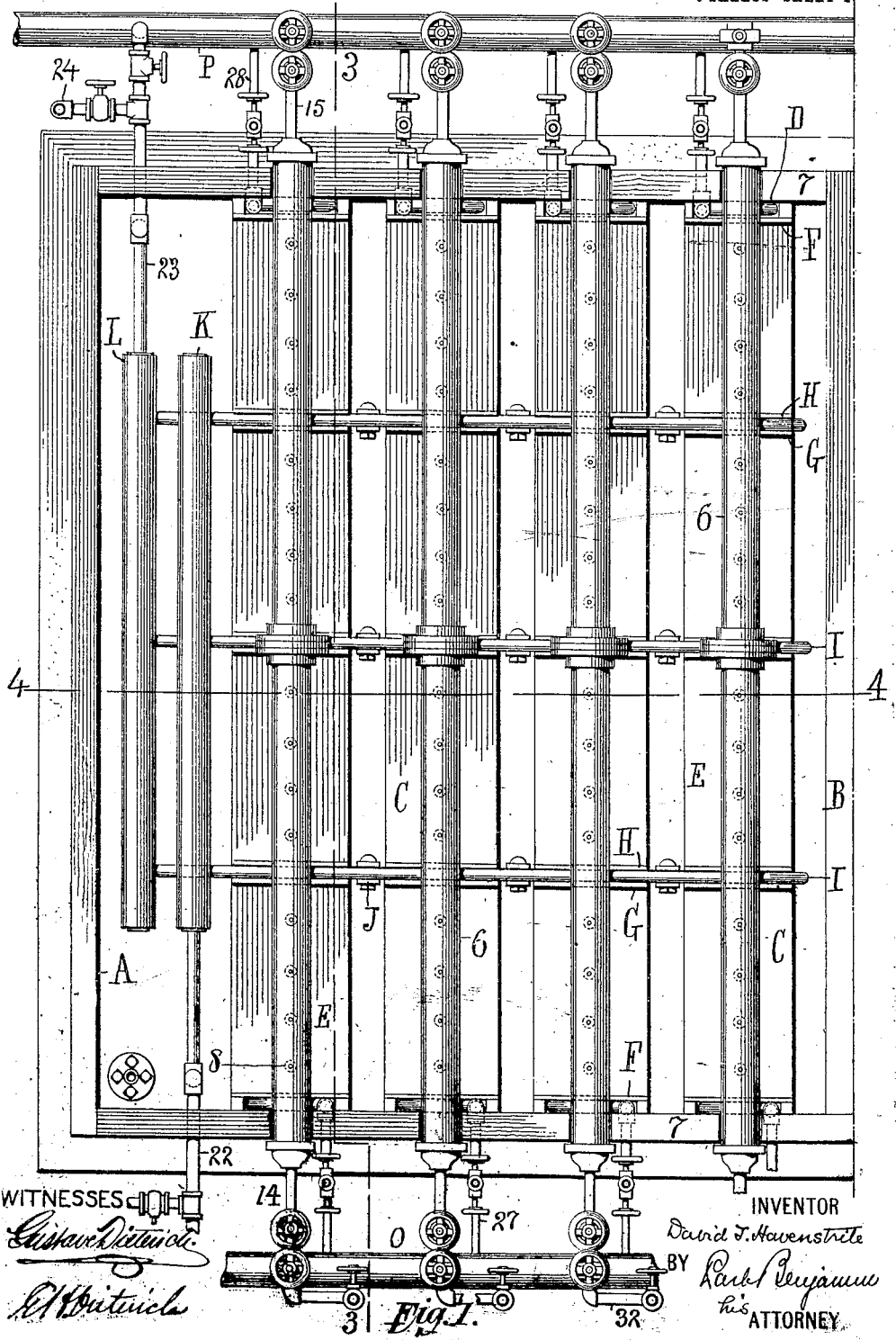
D. J. HAVENSTRITE.
APPARATUS FOR MAKING ICE.
APPLICATION FILED JULY 1, 1908.
938,853.  Patented Nov. 2, 1909.

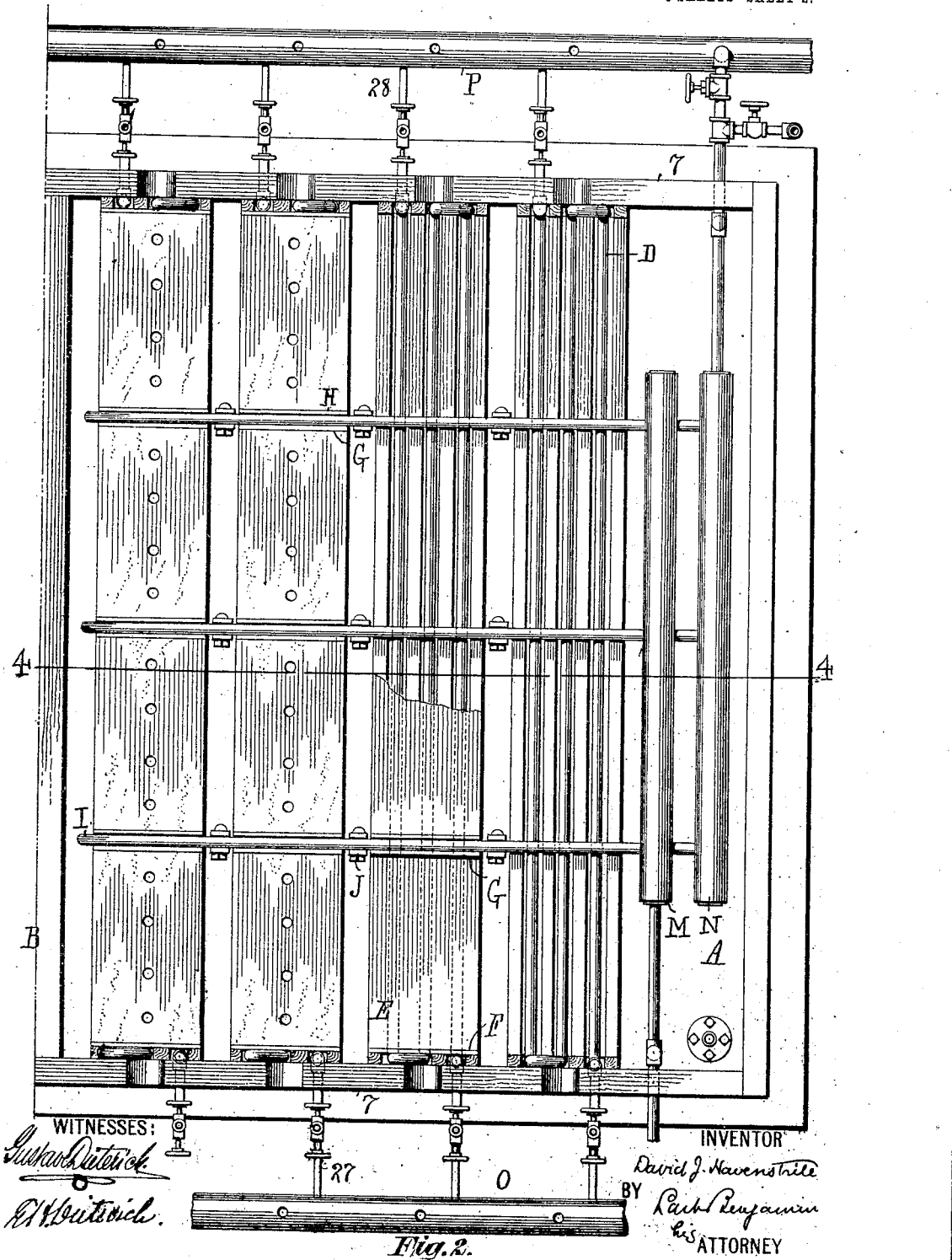

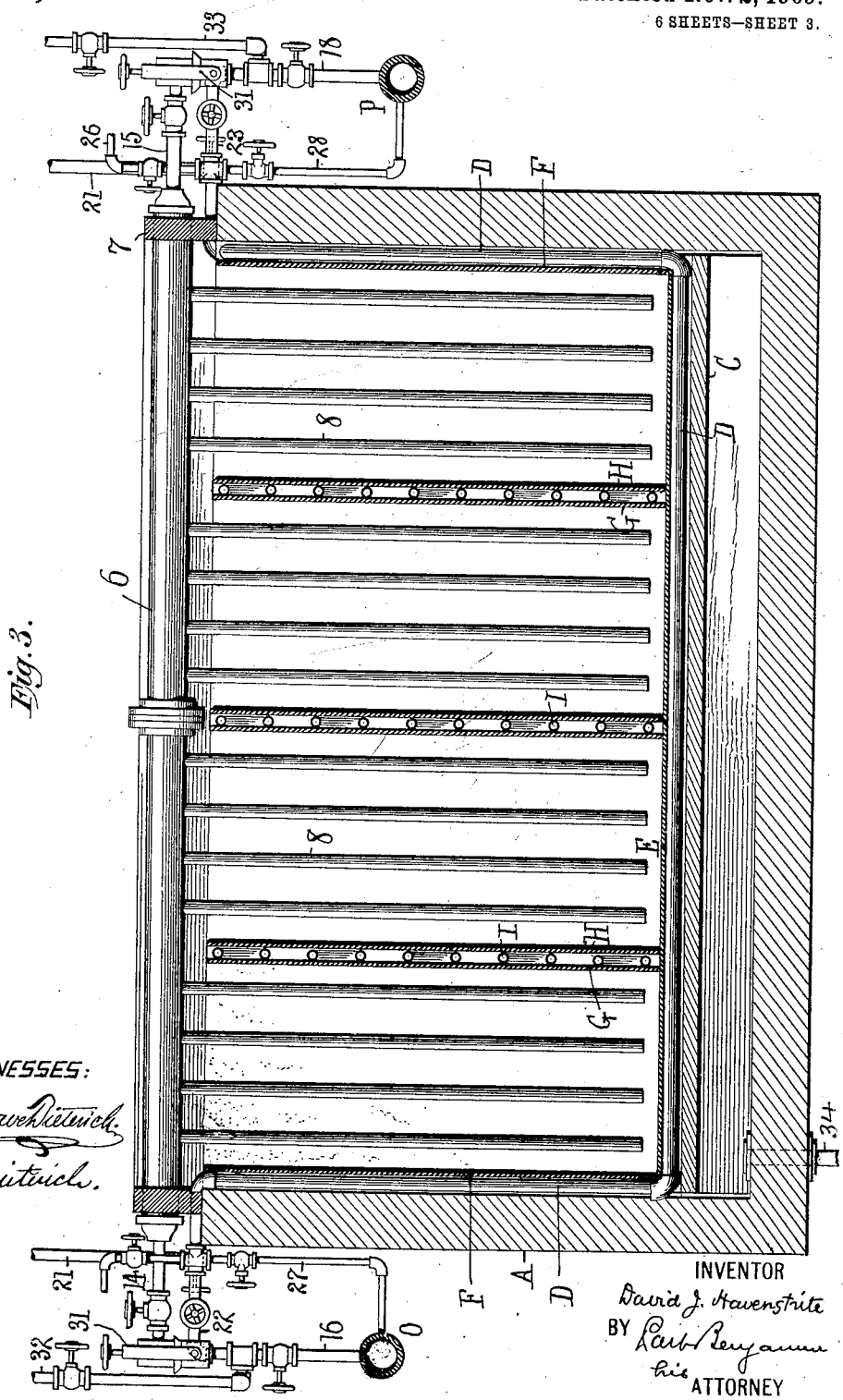

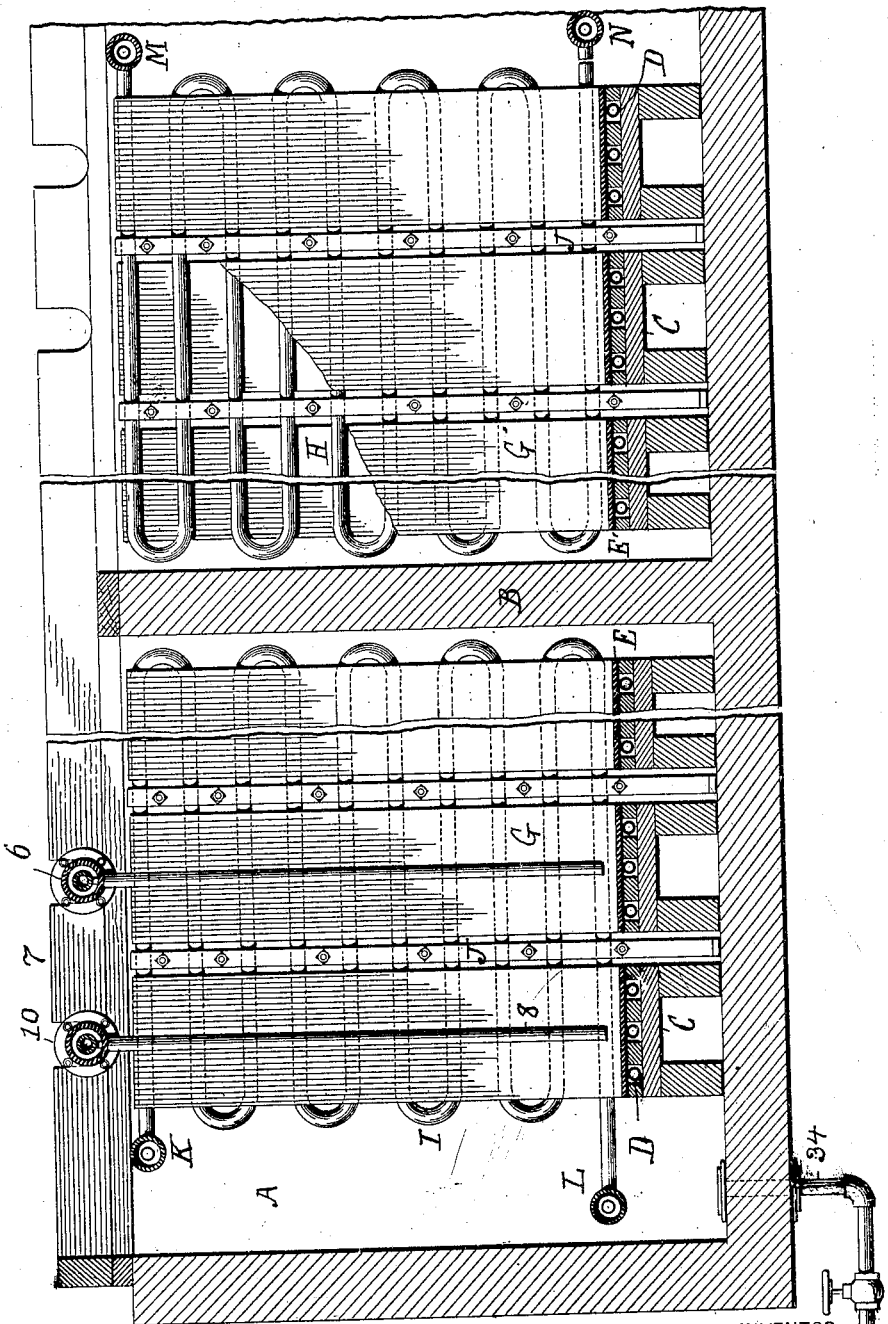

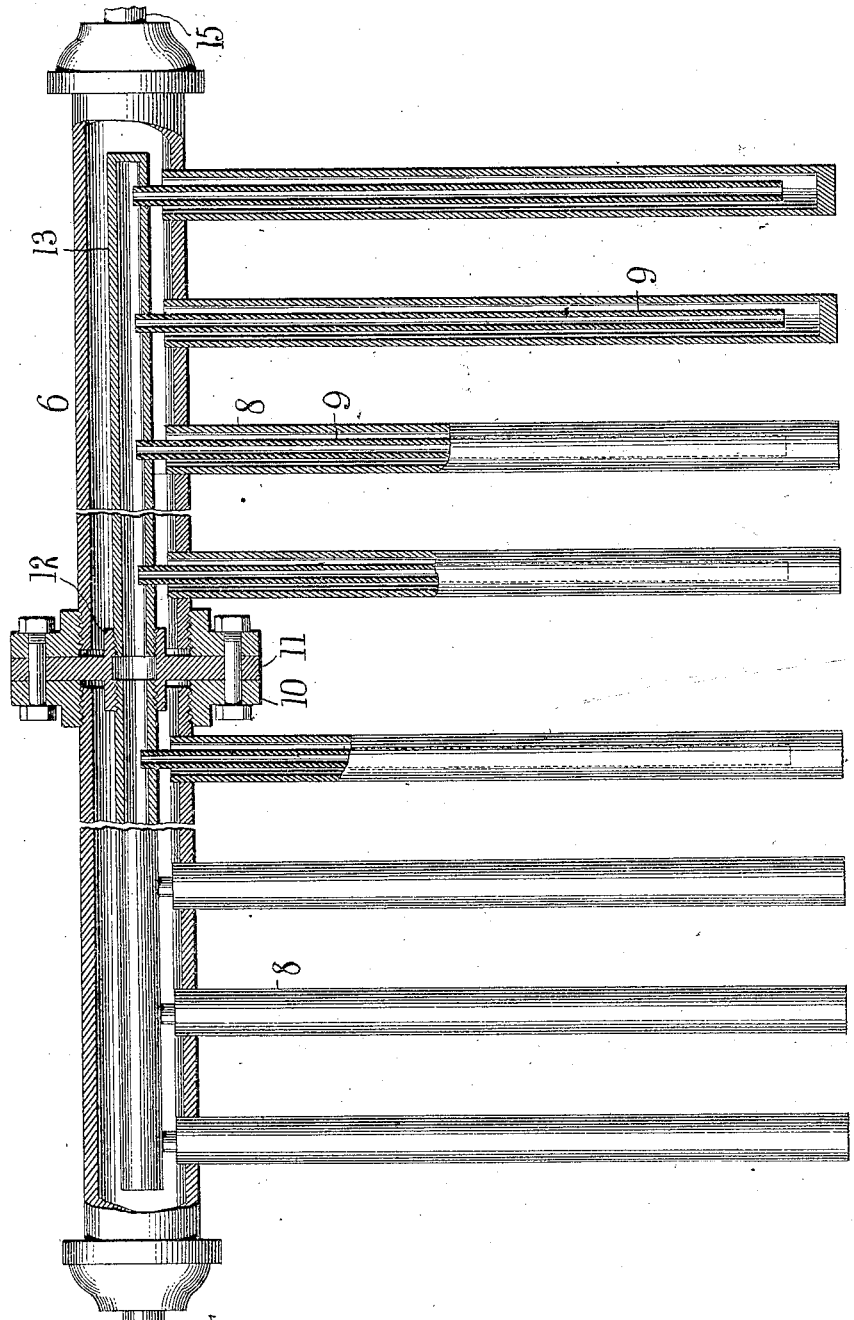

938,853.

Patented Nov. 2, 1909.
6 SHEETS—SHEET 6.

WITNESSES:
Gertrude T. Porter.
May J. McGarry.

INVENTOR
David J. Havenstrite
BY
his ATTORNEY

UNITED STATES PATENT OFFICE.

DAVID J. HAVENSTRITE, OF NEWARK, NEW JERSEY.

APPARATUS FOR MAKING ICE.

938,853.  Specification of Letters Patent.  Patented Nov. 2, 1909.

Application filed July 1, 1908. Serial No. 441,379.

*To all whom it may concern:*

Be it known that I, DAVID J. HAVENSTRITE, a citizen of the United States, residing at Newark, in the county of Essex and State of New Jersey, have invented certain new and useful Improvements in Apparatus for Making Ice, of which the following is a specification.

The invention consists in apparatus for producing ice in blocks of definite dimensions in a tank containing the body of water to be frozen, by simultaneously and independently freezing fractions of said body of water, each included in a separate cell disposed within said tank and having its walls independent of the tank walls.

The apparatus includes broadly a tank, a plurality of molding cells having walls independent of the tank walls, and refrigerating means disposed within the space bounded by the walls of each cell.

The invention further consists in the construction, whereby the ice block may be thawed off from each cell, and in the various combinations more particularly recited in the claims.

Figure 7:
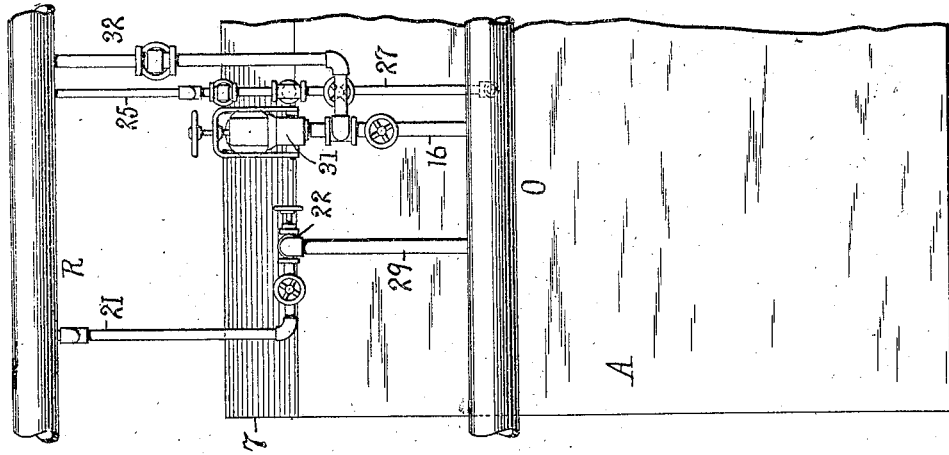
Figure 6:
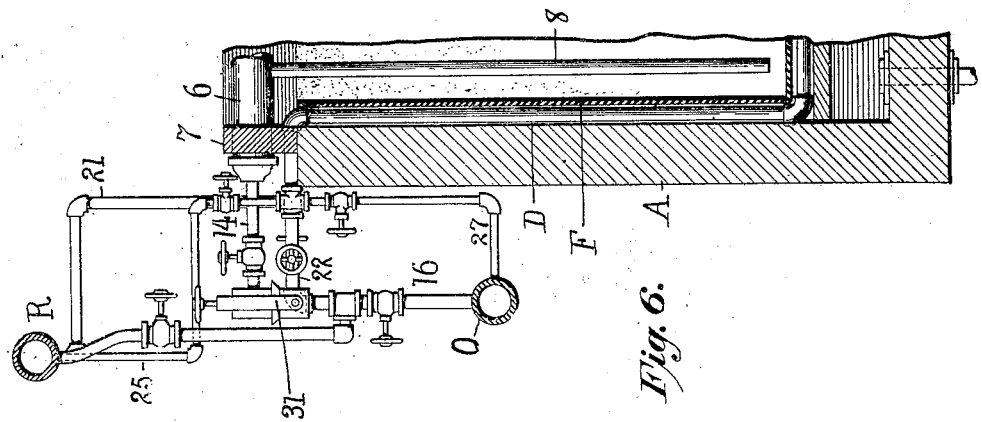

In the accompanying drawings—Figure 1 is a plan view of the left hand section and Fig. 2 is a plan view of the right hand section of the tank: so that if Fig. 2 be placed to the right of Fig. 1 the whole tank in plan is shown. In Fig. 2 the headers 6 and connections are removed. In the two series of cells at the left the ice blocks are shown formed. In the two series of cells on the right, the bottom plates are broken away to show the coils beneath. Fig. 3 is a vertical transverse section on the line 3 3 of Fig. 1. Fig. 4 is a vertical longitudinal section on the line 4 4 of Figs. 1 and 2. Fig. 5 shows a header 6 and depending refrigerating tubes, parts being broken away and in section to exhibit the internal construction. Fig. 6 shows a portion of the tank in section and the connections for fluid supply. Fig. 7 is a side elevation of the same.

Similar characters of reference indicate like parts.

A is a tank containing the water to be frozen here divided into two sections by the vertical partition B. Supported above the bottom of the tank by suitable blocks are any desired number of horizontal planks C, extending parallel to one another transversely across the tank. Upon each plank is laid the horizontal portion of a pipe coil D, the turns of which are separated by wooden strips, which support the metal bottom plate E. Near the ends of each plate E are rising plates F which extend upward, nearly to the top of the tank. In the space between the plates F and the wall of the tank are disposed the vertical portions of the coil D, so that there is liquid circulation behind plates F, and under plate E.

Equidistantly spaced along each plate E are pairs of metal plates G, H, parallel to plates F and similarly extending upward. Between the several pairs of metal plates G, H, are pipe coils I shown in Fig. 4. The turns of these coils are horizontal and parallel, and they extend across the intervals between the pairs of plates G, H, supported on the several plates E. In said intervals said coils are supported by vertical bars J placed on opposite sides and bolted together. The upper ends of all the coils I in the left hand section of the tank (Fig. 1) are connected to a header K and the lower ends to a header L. Similarly in the right hand section the upper ends of the coils I are connected to a header M, and the lower ends to a header N; all of these headers K, L, M, N, being supported within the tank A.

It will be seen that by this construction I have provided within the tank a plurality of series of mold cells, each cell having a bottom formed by the horizontal plate E and two sides formed by the rising plates. Thus to illustrate in Fig. 3: the plate F, the plate G and so much of plate E as lies between plates F and G, form one cell. Similarly, the plate H, of one pair G, H, the plate G of the next pair G, H, and so much of the plate E as lies between said plates H, G, form another cell, and so on. And it will be further observed, that in proximity to and outside of the plates forming these cells lie the pipe coils D or I, as the case may be. Now, in each of these cells I produce, by the means to be described, a separate ice block, and thaw it free from the cell by the circulation of warm liquid through the coils D and I. The number of cells which may be made above each transverse plate E, is immaterial. Thus in the drawings, I show four. The number of series of cells is also immaterial. In Figs. 1 and 2, taken together, I show eight. So that in the whole apparatus as illustrated in Figs. 1 and 2 jointly, I have thirty-two cells, in each of which an ice block may be formed.

I will now describe the means for freezing the water to produce said blocks in said cells.

Extending above each series of four cells is a header 6, preferably seated at its ends in longitudinal supporting bars 7. From each header (Fig. 6) downwardly extend as many groups of tubes 8 as there are cells in a series. Thus in Fig. 3: the header 6 has four groups of tubes 8, and one group of tubes enters each cell, the lower ends of the tubes extending nearly to the bottom plate E. The number of tubes in each group is immaterial. I here show four.

The tubes 8 are closed at their lower ends, and within them are smaller tubes 9, open at both ends. The header 6, Fig. 5, is made in two sections threaded at their ends to receive collars 10. Between said collars is secured a partition 11, having an internally threaded central sleeve 12, which receives the threaded ends of the two sections of a horizontal pipe 13, the opposite ends of which pipe sections are closed. The tubes 9 enter the horizontal pipe 13. So that fluid entering header 6, by pipe 14, fills the left hand section of the header, passes down through the left hand group of four tubes 8, rises through the internal tubes 9 to horizontal pipe 13, thence passes down through the right hand group of four tubes 8, rises through their internal tubes 9 to the right hand section of header 6, whence it escapes by pipe 15.

I will now describe the connections and the general operation of the apparatus. The headers 6 being put in place, with the several groups of depending tubes in the several cells, refrigerating liquid, delivered from any suitable source to a header O suitably supported outside of the tank (Figs. 6 and 7), passes by pipes 16 to pipes 14, and so to the headers 6, and into the freezing tubes 8. Ice is then formed upon each of said tubes 8, in a gradually thickening layer or cylinder. These several cylinders meet, and ultimately an ice block is formed, as already stated, filling each cell. After passing through the tubes 8, the refrigerating liquid passes by pipe 15 to pipe 18 to header P outside of the tank (Fig. 3), and so to any desired outlet. After the ice blocks are formed in the several cells, they are thawed off free from the cell surfaces by warm liquid circulated in coils D and I, from the header R, to a similar header (not shown) on the opposite side of the tank.

The connections from header R to and through coils I, are as follows: by pipe 21, Figs. 6 and 7, to pipe 22, Fig. 1, to header K through coils I, to header L by pipe 23; and pipe 24 to opposite header. A similar arrangement is provided in the other section of the tank, as shown on the right of Fig. 2. The connections from header R to and through coils D, are as follows: by pipes 25 to coils D to pipes 26, Fig. 3, and opposite header. If desired, refrigerating fluid may be led through coils D and I, from header O. The connection from header O to and through coils D is by pipes 27 to coils D and by pipes 28 to header P. The connection from header O to and through the coils I, is by pipe 29, Fig. 7, to pipe 23, to header K through coils I, to header L, and by pipe 30 to pipe 23.

Suitable valves are provided in the several pipes in order to establish the aforesaid connections with the headers. After the ice blocks are thawed clear of the cells, the headers 6, with said blocks still attached to the tubes 8, are lifted out of their seats, and said headers, tubes and blocks, are transported to any place where it may be desired to free the blocks from the tubes. To this end, couplings 31 of any suitable description, between the pipes 15 and 18, and 16 and 14, are disconnected. The blocks are then thawed from the tubes 8 by connecting the pipe 14 with any suitable source of warm liquid supply, so that said liquid may circulate through said tubes and escape at pipe 15.

If it be desired to turn warm liquid into the tubes 8, to release them from the ice block in order that they may be removed leaving said block in the tank, this is accomplished by means of the pipe 32 connecting header R and pipe 16, Fig. 7, and pipe 33 connecting pipe 18 with the opposite header, Fig. 3.

The usual pipe for drawing off water from the tank is shown at 34.

I claim:

1. In an ice making apparatus, a tank, a series of individual molding cells therein each cell having all of its walls independent of the tank walls, a header extending over said cells, and groups of refrigerating tubes depending from said header the said groups of tubes being respectively disposed within said cells.

2. In an ice making apparatus, a tank, a plurality of molding cells therein having walls independent of the tank walls, a support, refrigerating tubes depending from said support disposed within said cells, and means for thawing off the ice cake formed in contact with the inner surface of each cell.

3. In an ice making apparatus, a tank, a plurality of molding cells therein having walls independent of the tank walls, a support, refrigerating tubes depending from said support disposed within said cells, and means for thawing off the ice cake formed in contact with the inner surface of each cell, and coils for conveying liquid disposed in proximity to the outer surface of each cell.

4. In an ice making apparatus, a tank, a three-sided mold cell therein receiving the water to be frozen and formed of a horizontal member and two members rising therefrom, a support, and refrigerating tubes depending from said support and disposed within said cell.

5. In an ice making apparatus, a tank, a series of mold cells therein, each cell being formed of a transverse bottom plate common to all of said cells and a pair of plates rising therefrom, a header above said cells, and groups of refrigerating tubes depending from said header and respectively disposed within said cells.

6. In an ice making apparatus, a tank, a series of mold cells therein, formed of a transverse bottom plate and pairs of plates rising therefrom, and coils for conveying liquid disposed between the adjacent rising plates of the several cells.

7. In an ice making apparatus, a tank, a series of mold cells therein, formed of a transverse bottom plate and pairs of plates rising therefrom, and a coil for conveying liquid disposed between the outermost rising plates of the series of cells and below said bottom plate.

8. In an ice making apparatus, a tank, a series of mold cells therein, formed of a transverse bottom plate and pairs of plates rising therefrom, a coil for conveying liquid disposed below said bottom plate, and coils for conveying liquid disposed between the adjacent rising plates of the several cells.

9. In an ice making apparatus, a tank, two parallel series of mold cells therein, each series of cells being formed of a transverse bottom plate and pairs of plates rising therefrom, and coils for conveying liquid disposed between the adjacent rising plates of the several cells of each series and extending across the interval from one series of cells to the other.

10. In an ice making apparatus, two parallel series of mold cells therein, each series of cells being formed of a transverse bottom plate and pairs of plates rising therefrom, an upper and a lower header disposed transversely across said tank at one end thereof, and coils for conveying liquid connected at their upper and lower ends respectively to said headers, and disposed between the adjacent rising plates of the several cells of each series and extending across the interval from one series of cells to the other.

11. In an ice making apparatus, a tank, two parallel series of mold cells therein, each series of cells being formed of a transverse bottom plate and pairs of plates rising therefrom, and coils for conveying liquid respectively disposed between the outermost rising plates of each series of cells and the walls of said tank, and below the bottom plates of said series of cells.

In testimony whereof I have affixed my signature in presence of two witnesses.

DAVID J. HAVENSTRITE.

Witnesses:
GERTRUDE T. PORTER,
MAY S. McGARRY.